(12) United States Patent
Chang et al.

(10) Patent No.: US 10,109,240 B2
(45) Date of Patent: Oct. 23, 2018

(54) DISPLAYS WITH MULTIPLE SCANNING MODES

(71) Applicant: Apple Inc., Cupertino, CA (US)

(72) Inventors: Shih Chang Chang, Cupertino, CA (US); Keitaro Yamashita, Nishinomiya (JP); Shin-Hung Yeh, Taipei (TW); Ting-Kuo Chang, San Jose, CA (US); Abbas Jamshidi Roudbari, Sunnyvale, CA (US); Chin-Wei Lin, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/403,070

(22) Filed: Jan. 10, 2017

(65) Prior Publication Data

US 2018/0075809 A1 Mar. 15, 2018

Related U.S. Application Data

(60) Provisional application No. 62/385,411, filed on Sep. 9, 2016.

(51) Int. Cl.
*G09G 3/3266* (2016.01)
*G09G 3/3291* (2016.01)
(Continued)

(52) U.S. Cl.
CPC ......... *G09G 3/3266* (2013.01); *G09G 3/3291* (2013.01); *G09G 5/18* (2013.01);
(Continued)

(58) Field of Classification Search
USPC ........................................................ 345/690
See application file for complete search history.

(56) References Cited

U.S. PATENT DOCUMENTS

| 5,712,652 A | 1/1998 | Sato et al. |
| 7,196,700 B1 | 3/2007 | Aho et al. |

(Continued)

FOREIGN PATENT DOCUMENTS

| CN | 1428760 A | 7/2003 |
| CN | 1705008 A | 12/2005 |

(Continued)

OTHER PUBLICATIONS

Yamashita et al., U.S. Appl. No. 15/384,096, filed Dec. 19, 2016.

*Primary Examiner* — Srilakshmi K Kumar
*Assistant Examiner* — Chineyere Wills-Burns
(74) *Attorney, Agent, or Firm* — Treyz Law Group, P.C.; Joseph F. Guihan

(57) ABSTRACT

An electronic device may include a display such as a light-emitting diode display. The electronic device may be a head-mounted device that provides a virtual reality or augmented reality environment to a user. To reduce artifacts in the display, a display may be operable in both a normal scanning mode and a partial scanning mode. In the normal scanning mode, every row of the display may be scanned in each frame. In the partial scanning mode, only a subset of the rows of the display may be scanned in each frame. The display may have a higher refresh rate in the partial scanning mode than in the normal scanning mode. The gate driver circuitry may include a shift register that includes a plurality of register circuits. At least one register circuit may have a first input and a second input that is different than the first input.

13 Claims, 11 Drawing Sheets

(51) Int. Cl.
*G09G 5/18* (2006.01)
*G06T 19/00* (2011.01)
*G09G 3/36* (2006.01)

(52) U.S. Cl.
CPC .......... *G06T 19/006* (2013.01); *G09G 3/3677* (2013.01); *G09G 2300/0809* (2013.01); *G09G 2310/0267* (2013.01); *G09G 2310/0286* (2013.01); *G09G 2310/04* (2013.01); *G09G 2340/0414* (2013.01); *G09G 2340/0435* (2013.01)

(56) References Cited

U.S. PATENT DOCUMENTS

| | | |
|---|---|---|
| 7,714,832 B2 | 5/2010 | Tong et al. |
| 8,130,216 B2 | 3/2012 | Washio et al. |
| 9,262,981 B2 | 2/2016 | Wang |
| 9,412,314 B2 | 8/2016 | Amundson et al. |
| 9,449,994 B2 | 9/2016 | Kwon et al. |
| 2004/0222951 A1 | 11/2004 | Lee et al. |
| 2006/0007098 A1* | 1/2006 | Tong .................... G09G 3/3413 345/102 |
| 2006/0256066 A1* | 11/2006 | Moon .................. G09G 3/3677 345/100 |
| 2007/0040792 A1* | 2/2007 | Kwag .................. G09G 3/2092 345/100 |
| 2008/0036753 A1* | 2/2008 | Washio ................ G09G 3/3648 345/212 |
| 2010/0309230 A1 | 12/2010 | Cho |
| 2013/0241814 A1* | 9/2013 | Hirabayashi ......... G09G 3/3677 345/100 |
| 2013/0293529 A1 | 11/2013 | You et al. |
| 2016/0225311 A1* | 8/2016 | Hwang ................ G09G 3/3208 |
| 2016/0267713 A1 | 9/2016 | Patel |
| 2017/0169757 A1* | 6/2017 | Kim .................... G09G 3/2092 |

FOREIGN PATENT DOCUMENTS

| | | |
|---|---|---|
| CN | 1885379 A | 12/2006 |
| CN | 103137081 A | 6/2013 |
| CN | 103680439 A | 3/2014 |
| CN | 103680443 A | 3/2014 |
| CN | 105513556 A | 4/2016 |

* cited by examiner

DISPLAYS WITH MULTIPLE SCANNING MODES

This application claims the benefit of provisional patent application No. 62/385,411, filed on Sep. 9, 2016, which is hereby incorporated by reference herein its entirety.

BACKGROUND

This relates generally to displays, and, more particularly, to displays with multiple scanning modes.

Electronic devices often include displays. For example, cellular telephones and portable computers include displays for presenting information to users. An electronic device may have an organic light-emitting diode display based on organic-light-emitting diode pixels or a liquid crystal display based on liquid crystal pixels. Displays may be incorporated in devices that are mounted on a user's head such as virtual reality and augmented reality headsets.

It can be challenging to design devices such as these. The display may have a high resolution and may sometimes need to operate at a high refresh rate, resulting in each row in the display having a low scan time. This may result in poor display uniformity and other visible artifacts.

It would therefore be desirable to be able to provide an improved display that can operate at normal and high refresh rates.

SUMMARY

An electronic device may include a display such as a light-emitting diode display. The electronic device may be a head-mounted device that provides a virtual reality or augmented reality environment to the user.

Displays may be provided with high resolution and may operate with high refresh rates. To reduce image artifacts in the display at high refresh rates, a display may be operable in both a normal scanning mode and a partial scanning mode. In the normal scanning mode, every row of the display may be scanned in each frame. In the partial scanning mode, only a subset of the rows of the display may be scanned in each frame. The display may have a higher refresh rate in the partial scanning mode than in the normal scanning mode.

The display may include an array of pixels formed in an active area of the display, display driver circuitry formed in an inactive area of the display that is configured to provide image data to the pixels, and gate driver circuitry formed in the inactive area of the display. The gate driver circuitry may include a shift register that includes a plurality of register circuits. Each register circuit may have at least one output that is provided to a corresponding row of pixels. At least one register circuit in the shift register may have a first input and a second input that is different than the first input. The first input may be used when the display operates in the normal scanning mode and the second input may be used when the display operates in the partial scanning mode.

The display may be divided into sections, some of which are enabled only during the normal scanning mode. During the partial scanning mode, some of the sections may be disabled. The gate driver circuitry may include a gate driver and an emission driver with portions that correspond to respective sections of the display.

DETAILED DESCRIPTION

Figure 1:
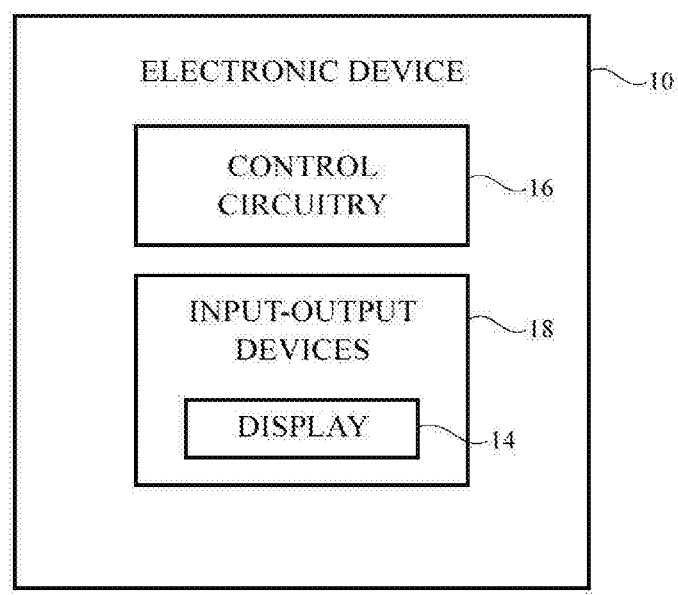
FIG. 1 is a schematic diagram of an illustrative electronic device having a display in accordance with an embodiment.

An illustrative electronic device of the type that may be provided with a display is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a display, a computer display that contains an embedded computer, a computer display that does not contain an embedded computer, a gaming device, a navigation device, an embedded system such as a system in which electronic equipment with a display is mounted in a kiosk or automobile, or other electronic equipment. Electronic device 10 may have the shape of a pair of eyeglasses (e.g., supporting frames), may form a housing having a helmet shape, or may have other configurations to help in mounting and securing the components of one or more displays on the head or near the eye of a user.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 18 may be used to allow data to be supplied to device 10 and to allow data to be provided from device 10 to external devices. Input-output devices 18 may include buttons, joysticks, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 18 and may receive status information and other output from device 10 using the output resources of input-output devices 18.

Input-output devices 18 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Control circuitry 16 may be used to run software on device 10 such as operating system code and applications. During operation of device 10, the software running on control circuitry 16 may display images on display 14.

Display 14 may be an organic light-emitting diode display, a display formed from an array of discrete light-emitting diodes each formed from a crystalline semiconductor die, or any other suitable type of display. Configurations in which the pixels of display 14 include light-emitting diodes are sometimes described herein as an example. This is, however, merely illustrative. Any suitable type of display may be used for device 10, if desired.

Figure 2:
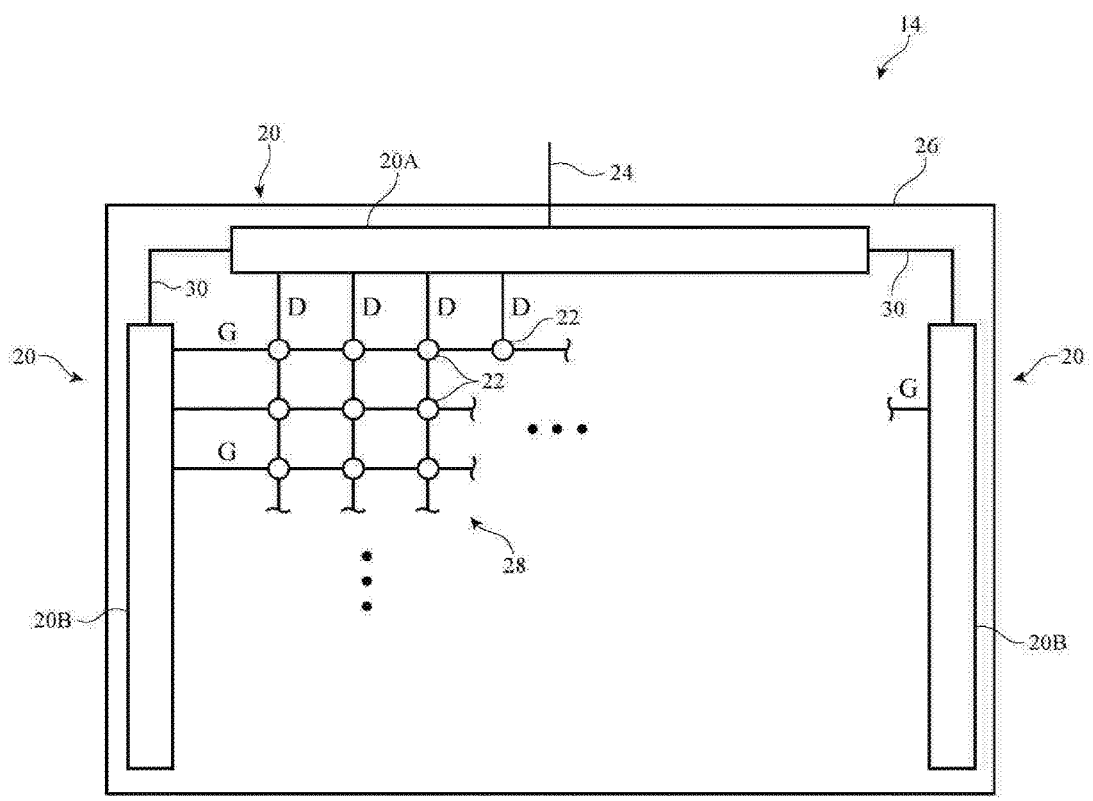
FIG. 2 is a schematic diagram of an illustrative display in accordance with an embodiment.

FIG. 2 is a diagram of an illustrative display. As shown in FIG. 2, display 14 may include layers such as substrate layer 26. Substrate layers such as layer 26 may be formed from rectangular planar layers of material or layers of material with other shapes (e.g., circular shapes or other shapes with one or more curved and/or straight edges). The substrate layers of display 14 may include glass layers, polymer layers, composite films that include polymer and inorganic materials, metallic foils, etc.

Display 14 may have an array of pixels 22 for displaying images for a user such as pixel array 28. Pixels 22 in array 28 may be arranged in rows and columns. The edges of array 28 may be straight or curved (i.e., each row of pixels 22 and/or each column of pixels 22 in array 28 may have the same length or may have a different length). There may be any suitable number of rows and columns in array 28 (e.g., ten or more, one hundred or more, or one thousand or more, etc.). Display 14 may include pixels 22 of different colors. As an example, display 14 may include red pixels, green pixels, and blue pixels. If desired, a backlight unit may provide backlight illumination for display 14.

Display driver circuitry 20 may be used to control the operation of pixels 28. Display driver circuitry 20 may be formed from integrated circuits, thin-film transistor circuits, and/or other suitable circuitry. Illustrative display driver circuitry 20 of FIG. 2 includes display driver circuitry 20A and additional display driver circuitry such as gate driver circuitry 20B. Gate driver circuitry 20B may be formed along one or more edges of display 14. For example, gate driver circuitry 20B may be arranged along the left and right sides of display 14 as shown in FIG. 2. Gate driver circuitry 20B may include gate drivers and emission drivers.

As shown in FIG. 2, display driver circuitry 20A (e.g., one or more display driver integrated circuits, thin-film transistor circuitry, etc.) may contain communications circuitry for communicating with system control circuitry over signal path 24. Path 24 may be formed from traces on a flexible printed circuit or other cable. The control circuitry may be located on one or more printed circuits in electronic device 10. During operation, the control circuitry (e.g., control circuitry 16 of FIG. 1) may supply circuitry such as a display driver integrated circuit in circuitry 20 with image data for images to be displayed on display 14. Display driver circuitry 20A of FIG. 2 is located at the top of display 14. This is merely illustrative. Display driver circuitry 20A may be located at both the top and bottom of display 14 or in other portions of device 10.

To display the images on pixels 22, display driver circuitry 20A may supply corresponding image data to data lines D while issuing control signals to supporting display driver circuitry such as gate driver circuitry 20B over signal paths 30. With the illustrative arrangement of FIG. 2, data lines D run vertically through display 14 and are associated with respective columns of pixels 22.

Gate driver circuitry 20B (sometimes referred to as gate line driver circuitry or horizontal control signal circuitry) may be implemented using one or more integrated circuits and/or may be implemented using thin-film transistor circuitry on substrate 26. Horizontal control lines G (sometimes referred to as gate lines, scan lines, emission control lines, etc.) run horizontally through display 14. Each gate line G is associated with a respective row of pixels 22. If desired, there may be multiple horizontal control lines such as gate lines G associated with each row of pixels. Individually controlled and/or global signal paths in display 14 may also be used to distribute other signals (e.g., power supply signals, etc.).

Gate driver circuitry 20B may assert control signals on the gate lines G in display 14. For example, gate driver circuitry 20B may receive clock signals and other control signals from circuitry 20A on paths 30 and may, in response to the received signals, assert a gate line signal on gate lines G in sequence, starting with the gate line signal G in the first row of pixels 22 in array 28. As each gate line is asserted, data from data lines D may be loaded into a corresponding row of pixels. In this way, control circuitry such as display driver circuitry 20A and 20B may provide pixels 22 with signals that direct pixels 22 to display a desired image on display 14. Each pixel 22 may have a light-emitting diode and circuitry (e.g., thin-film circuitry on substrate 26) that responds to the control and data signals from display driver circuitry 20.

Figure 3:
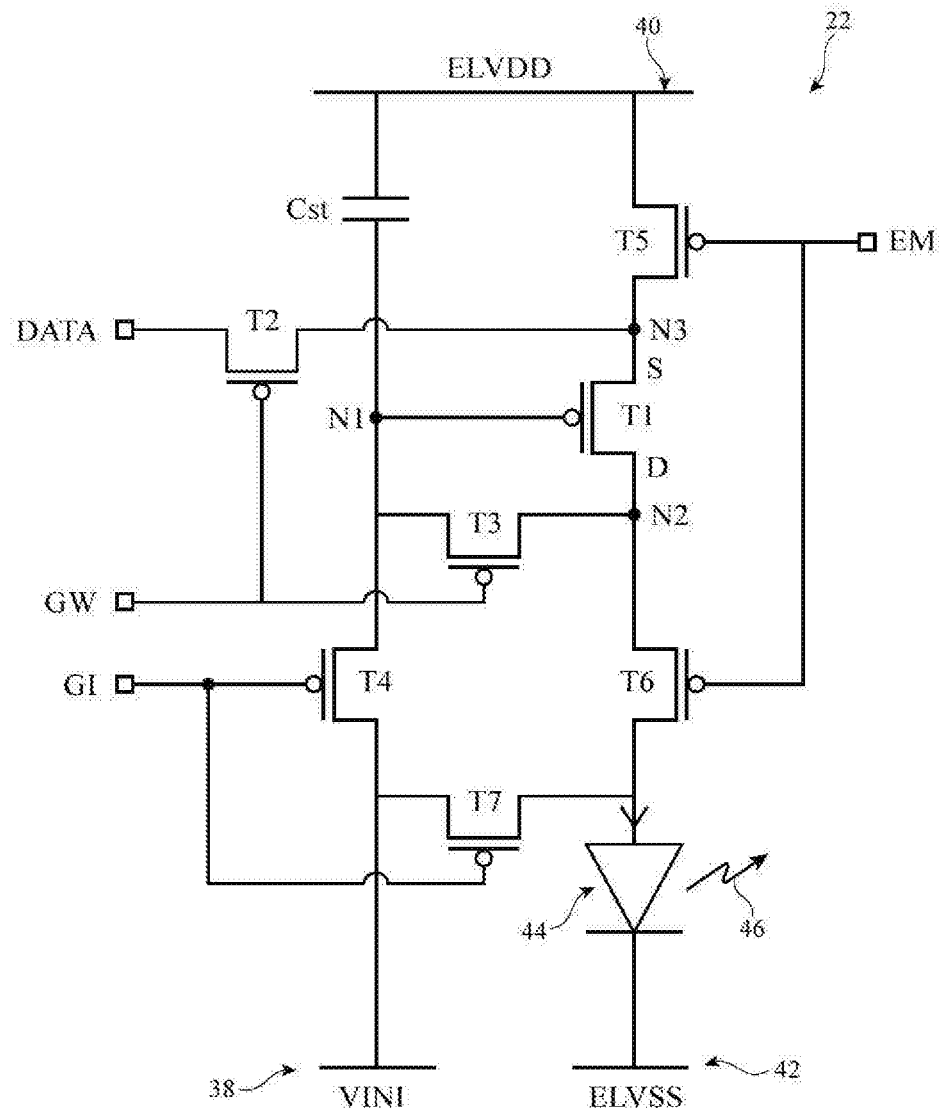
FIG. 3 is a diagram of an illustrative pixel circuit in accordance with an embodiment.

An illustrative pixel circuit of the type that may be used for each pixel 22 in array 28 is shown in FIG. 3. In the example of FIG. 3, pixel circuit 22 has seven transistors T1, T2, T3, T4, T5, T6, and T7 and one capacitor Cst, so pixel circuit 22 may sometimes be referred to as a 7T1C pixel circuit. Other numbers of transistors and capacitors may be used in pixels 22 if desired. The transistors may be p-channel transistors and/or may be n-channel transistors or other types of transistors. The active regions of thin-film transistors for pixel circuit 22 and other portions of display 14 may be formed from silicon (e.g., polysilicon channel regions), semiconducting oxides (e.g., indium gallium zinc oxide channel regions), or other suitable semiconductor thin-film layers.

As shown in FIG. 3, pixel circuit 22 includes light-emitting diode 44 (e.g., an organic light-emitting diode, a crystalline micro-light-emitting diode die, etc.). Light-emitting diode 44 may emit light 46 in proportion to the amount of current I that is driven through light-emitting diode 44 by transistor T1. Transistor T5, Transistor T1, Transistor T6, and light-emitting diode 44 may be coupled in series between respective power supply terminals (see, e.g., positive power supply terminal 40 (ELVDD) and ground power supply terminal 42 (ELVSS). Transistor T1 may have a source terminal (S) coupled to positive power supply terminal 40, a drain terminal (D) coupled to node N2, and a gate terminal coupled to node N1. The terms "source" and "drain" terminals of a transistor can sometimes be used interchangeably and may therefore be referred to herein as "source-drain" terminals. The voltage on node N1 at the gate of transistor T1 controls the amount of current I that is produced by transistor T1. This current is driven through light-emitting diode 44, so transistor T1 may sometimes be referred to as a drive transistor.

Transistors T5 and T6 can be turned off to interrupt current flow between transistor T1 and diode 44 and may be turned on to enable current flow between transistor T1 and diode 44. Emission enable control signal EM is applied to the gates of transistors T5 and T6. During operation, transistors T5 and T6 are controlled by emission enable control signal EM and are sometimes referred to as emission transistors or emission enable transistors. Control signals GW and GI, which may sometimes be referred to as switching transistor control signals, are applied to the gates of switching transistors T2, T3, T4, and T7 and control the operation of transistors T2. T3, T4, and T7. In particular, control signal GW is used to control transistors T2 and T3, while control signal GI is used to control transistors T4 and T7. The capacitor Cst of pixel circuit 22 may be used for data storage. Pixel 22 may also include reference voltage terminal 38 (VINI). Reference voltage terminal 38 may be used to supply a reference voltage (e.g., VINI may be approximately −3.4 Volts or any other desired voltage).

Operation of pixel 22 may be generally have two primary phases: a data writing phase and an emission phase. During the data writing phase, data may be loaded from data lines D (labeled as DATA in FIG. 3) to node N1. The data may be a data voltage that is loaded to Node 1 by turning on transistors T2, T1, and T3. After the data voltage has been loaded into pixel 22, display driver circuitry 20 places pixel 22 in its emission state. During the emission state, the value of the data voltage on node N1 controls the state of drive transistor T1 and thereby controls the amount of light 46 emitted by light-emitting diode 44.

It should be noted that manufacturing variations and variations in operating conditions can cause the threshold voltages of drive transistor T1 to vary. This may cause pixel brightness fluctuations which may give rise to undesired visible artifacts on a display. To help reduce visible artifacts, display 14 may employ any desired threshold voltage compensation techniques to compensate for threshold voltage variation in drive transistor T1.

The example of a 7T1C light-emitting diode pixel shown in FIG. 3 is merely illustrative. If desired, the transistors of the pixel may have a different arrangement than the arrangement shown in FIG. 3. Additional transistors or fewer transistors may be included in the pixel if desired.

Figure 4:
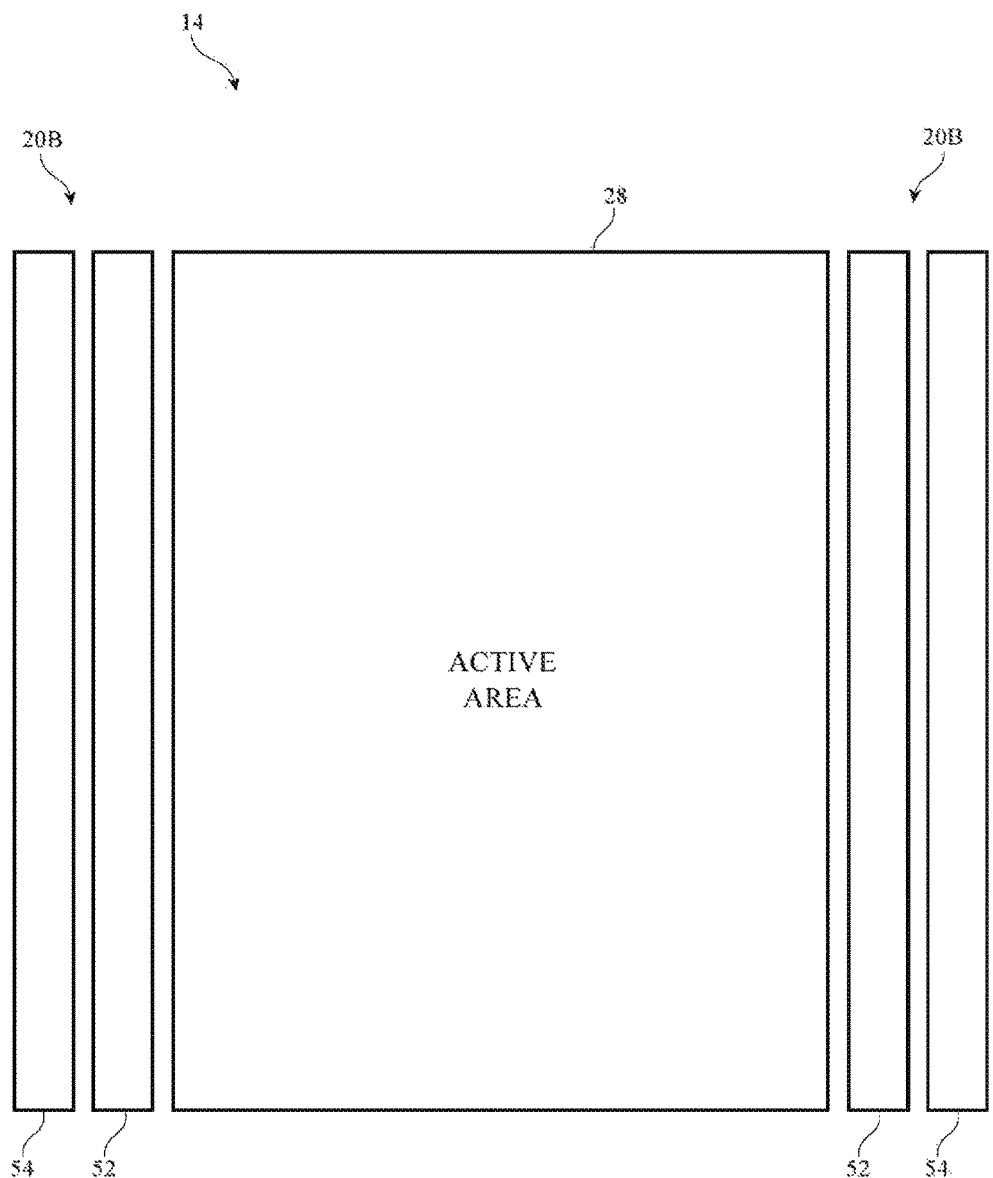
FIG. 4 is a top view of an illustrative display showing how the display's gate driver circuitry may include one or more gate drivers and one or more emission drivers in accordance with an embodiment.

FIG. 4 shows a top view of an illustrative display with gate driver circuitry that includes a gate driver and an emission driver. Gate driver circuitry 208B may be formed along one or more edges of display 14. FIG. 4 shows an example where gate driver circuitry 20B is formed on opposing sides of pixel array 28 (sometimes referred to as an active area). For example, gate driver circuitry 20B may be arranged along the left and right sides of display 14. Gate driver circuitry 20B may include gate drivers (sometimes referred to as scan drivers) and emission drivers on each side of the active area. FIG. 4 shows gate drivers 52 and emission drivers 54 on opposing sides of the active area. The gate drivers may be configured to supply control signals to each pixel in the display (i.e., the gate drivers may supply switching transistor control signals GW and GI to transistors T2, T3, T4, and T7 in each pixel 22 of FIG. 3). The emission drivers may be configured to supply an emission enable control signal EM to the gates of transistors such as transistors T5 and T6 of pixel 22 in FIG. 3. The emission and gate drivers may be used to address a respective half of the pixel array. For example, the gate driver 52 to the left of the active area may be used to address pixels on the left half of the display, and the gate driver 52 to the right of the active area may be used to address pixels on the right half of the display. Similarly, the emission driver 54 to the left of the active area may be used to address pixels on the left half of the display, and the emission driver 54 to the right of the active area may be used to address pixels on the right half of the display.

The example of having a scan driver and gate driver on two opposing sides of the active area of display 14 is merely illustrative. If desired, gate driver circuitry 20B may be formed on only one side of the active area, on three or more sides of the area, or in any other desired location within the electronic device.

Each emission driver and scan driver may contain a shift register formed from a chain of register circuits. Each register circuit may supply horizontal control signals (e.g., switching transistor control signals, emission enable signals, etc.) to a corresponding row of pixels. During operation, control circuitry 16 may initiate propagation of a control pulse through the shift register. As the control pulse propagates through the shift register, each gate line G may be activated in sequence, allowing successive rows of pixels 22 to be loaded with data from data lines D. Each register circuit may be referred to as a stage of the shift register.

Figure 5:
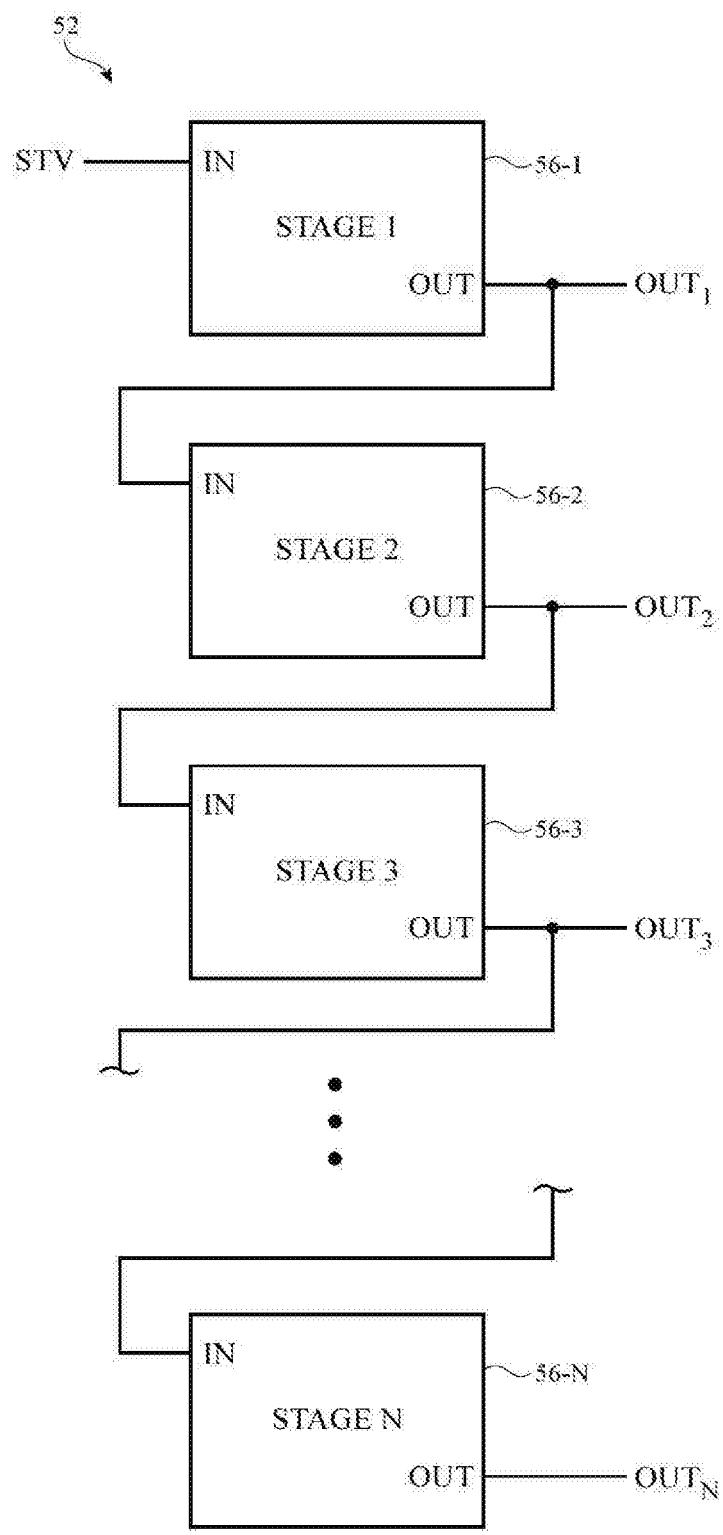
FIG. 5 is a schematic diagram of an illustrative shift register that may be used to form a gate driver or an emission driver for a display in accordance with an embodiment.

FIG. 5 is a schematic diagram of a shift register that may be used to form a gate driver such as gate driver 52 in FIG. 4. The shift register may include a chain of register circuits 56. Each register circuit may supply a horizontal control signal to a corresponding row of pixels. For example, a first register circuit 56-1 may have an output $OUT_1$ that is coupled to the first row of pixels in the display. The second register circuit 56-2 may have an output $OUT_2$ that is coupled to the second row of pixels in the display. The third register circuit 56-3 may have an output $OUT_3$ that is coupled to the third row of pixels in the display. This pattern may continue until the last row of the display. Register circuit 56-N may be associated with the last row of pixels in the active area and may have an output $OUT_N$, that is coupled to the last row of pixels in the display.

The first stage (56-1) of the shift register may receive a control pulse (STV) at the input of the first stage. The output of each stage in the shift register may be coupled to the input of the subsequent stage, allowing the control pulse to be propagated through the shift register. For example, the control pulse STV may be provided to the first stage 56-1.

This may activate the output of stage 56-1. The output of 56-1 is coupled to the input of stage 56-2, so when the output of 56-1 is activated, the input of 56-2 may be activated. The output of stage 56-2 may be coupled to the input of 56-3, and this pattern may be continued such that the control pulse STV may be propagated through the shift register to activate the output of each register circuit.

Figure 6:
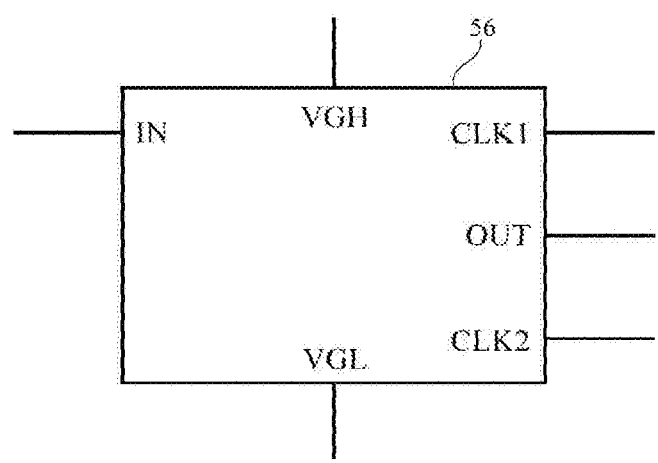
FIG. 6 is a schematic diagram of an illustrative register circuit that may be used in the shift register of FIG. 5 in accordance with an embodiment.

For simplicity, each register circuit in FIG. 5 is depicted as having a single input and a single output. However, each register circuit may have additional inputs and/or outputs as shown in FIG. 6. FIG. 6 shows a detailed view of a register circuit that may be used to form a shift register for gate driver 52 or emission driver 54. The register circuit may include an input (IN) and an output (OUT). The input may be the output from the previous register circuit. The input of the first register circuit may be control pulse STV. The register circuit may also receive clock signals CLK1 and CLK2. Finally, each register circuit may receive first and second supply voltages VGH and VGL.

The shift register structure shown in FIGS. 5 and 6 was described as forming a gate driver (e.g., gate driver 52 in FIG. 4). However, this type of structure may also be used to form an emission driver (e.g., emission driver 54 in FIG. 4). Instead of control pulse STV, the first stage of a shift register for emission driver 54 may receive an emission enable control pulse EMSTV. The output of the register circuits of gate driver 52 shown in FIG. 5 may be provided as control signals GW or GI to pixels 22, while the output of the register circuits of an emission driver 54 may be provided as emission enable control signal EM to pixels 22.

Figure 7:
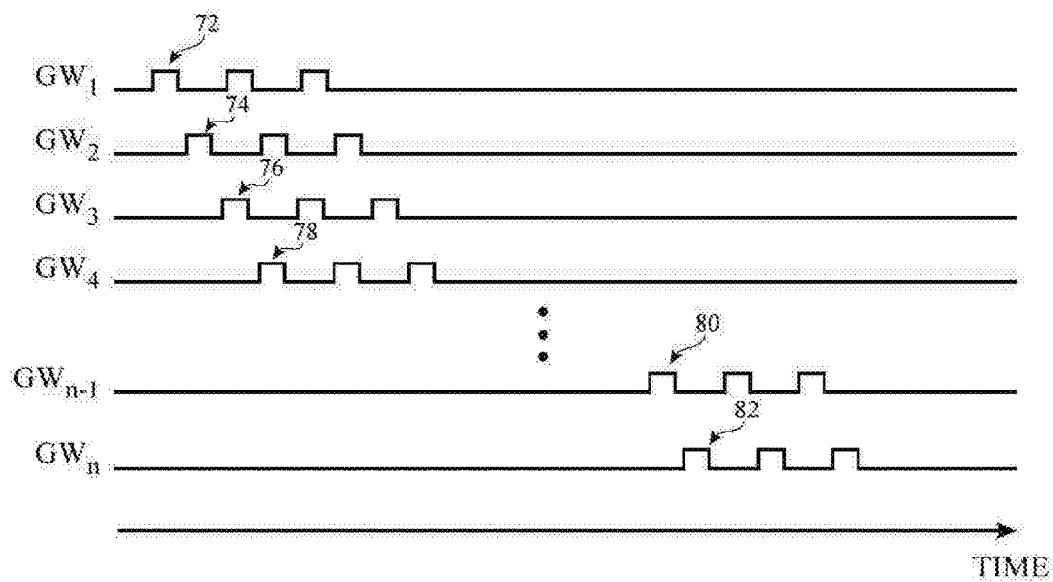
FIG. 7 is a timing diagram showing how a shift register that forms a gate driver for a display may assert various control signals in accordance with an embodiment.
Figure 8:
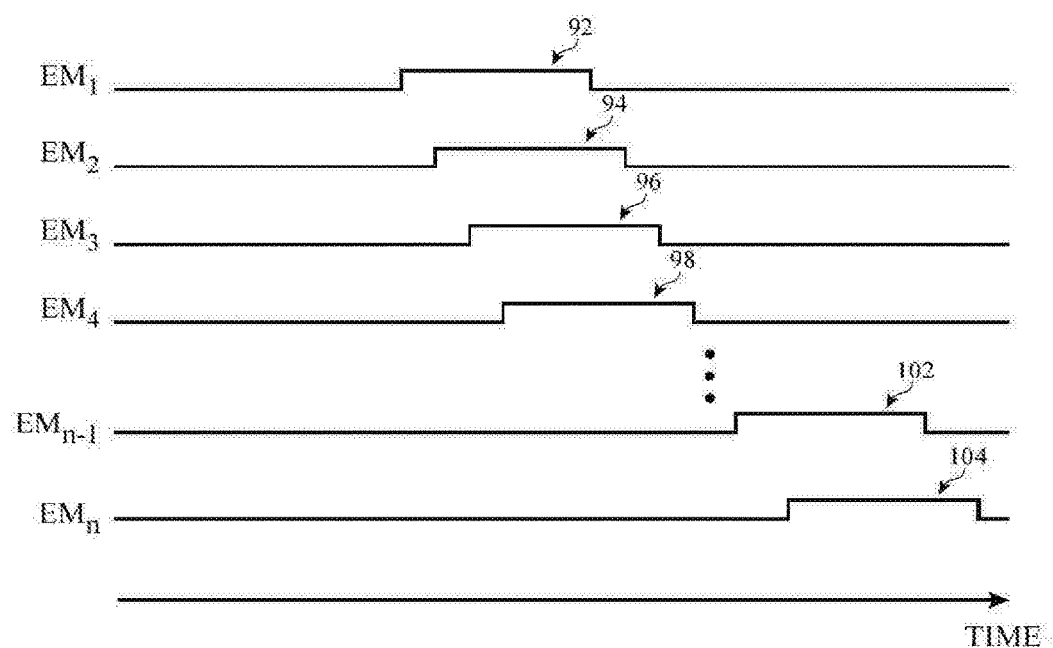
FIG. 8 is a timing diagram showing how a shift register that forms an emission driver for a display may assert various control signals in accordance with an embodiment.

FIGS. 7 and 8 are timing diagrams illustrating how the shift register shown in FIG. 5 may result in a propagation of a control signal through each row in the display. FIG. 7 shows signals that may be output from a gate driver such as gate driver 52 in a normal scanning mode. The output signals may be supplied to each pixel as control signal GW, for example. As shown in FIG. 7, the first control signal $GW_1$ may be asserted at assertion 72. This may result in the control signal $GW_2$ being asserted at assertion 74. Control signal $GW_3$ may subsequently be asserted at assertion 76, and control signal $GW_4$ may subsequently be asserted at assertion 78. The propagation of assertions 72, 74, 76, and 78 may be caused by the setup of the shift register that forms gate driver 52. The signal may continue through the shift register until the end of the display. Control signal $GW_{N-1}$ (i.e., the control signal of the second to last row in the display) may be asserted at assertion 80, which may cause the assertion of control signal $GW_N$ (i.e., the control signal of the last row in the display) at assertion 82. FIG. 7 shows that each control signal is asserted three times in sequence. This type of scheme may be used if desired (i.e., for initialization and loading). However, this example is merely illustrative and each control signal may be asserted only once, twice, more than three times, or any other desired number of times.

FIG. 8 shows signals that may be output from an emission driver such as emission driver 54 in a normal scanning mode. The output signals may be supplied to each pixel as emission enable control signal EM. As shown in FIG. 8, the first emission enable control signal $EM_1$ may be asserted at assertion 92. This may result in the emission enable control signal $EM_2$ being asserted at assertion 94. Emission enable control signal $EM_3$ may subsequently be asserted at assertion 96, and emission enable control signal $EM_4$ may subsequently be asserted at assertion 98. The propagation of assertions 92, 94, 96, and 98 may be caused by the setup of the shift register that forms emission driver 54. The signal may continue through the shift register until the end of the display. Emission enable control signal $EM_{N-1}$ (i.e., the emission enable control signal of the second to last row in the display) may be asserted at assertion 100, which may cause the assertion of emission enable control signal $EM_N$ (i.e., the emission enable control signal of the last row in the display) at assertion 102.

In the embodiment shown in FIGS. 7 and 8, every row in the display is scanned during each frame. This may be suitable for normal operation of the display (i.e., a normal scanning mode). However, in some instances, it may be desirable to scan only some of the rows in the display (i.e., a partial scanning mode). For example, the display may be operable in a high refresh rate. During normal operation, the refresh rate of the display may be approximately 60 Hz. During a high refresh rate mode, the refresh rate of the display may be greater than 60 Hz (i.e., 75 Hz, 90 Hz, 96 Hz, 120 Hz, etc.). As the refresh rate of the display increases, the amount of time for each row to be scanned decreases. If the scan time for each row is too low, the amount of time for voltage threshold compensation may not be sufficient and the display may have poor uniformity or other visible artifacts. To alleviate this issue, only some of the rows of the display may be scanned when the display operates at a high refresh rate.

In some embodiments, display 14 may be incorporated into a head mounted device, and the images displayed on display 14 may be dependent on the head position of the user in order to create an augmented reality (AR) or virtual reality (VR) environment for the user. In a virtual reality environment, only some of the display may be needed to present images to the user (i.e., a first portion may present images to the user's first eye and a second portion may present images to the user's second eye). Therefore, when a display is operated at a high refresh rate for virtual reality applications, only some of the rows of the display may be scanned to improve performance of the display.

Figure 9:
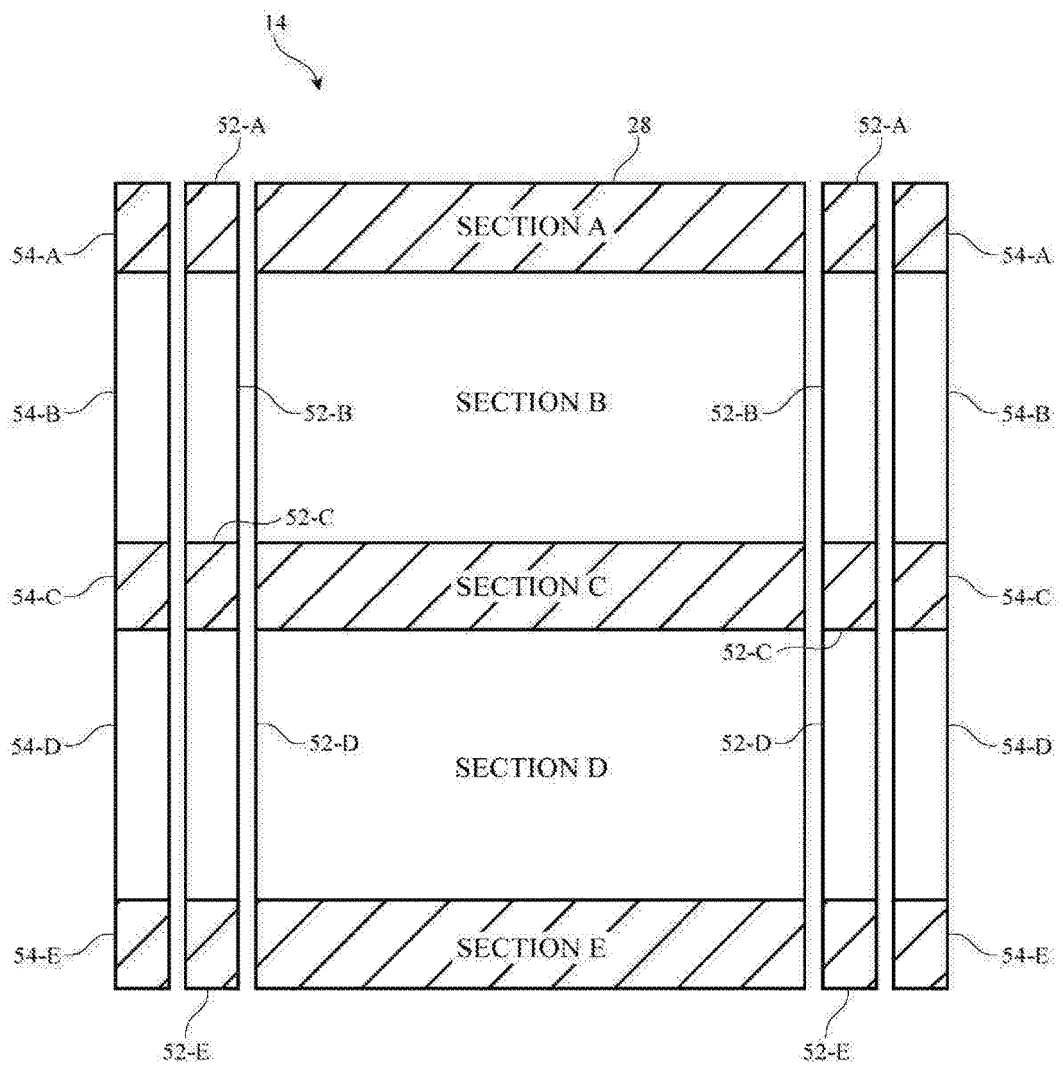
FIG. 9 is a top view of an illustrative display showing how the display may include a gate driver that is split into several portions and an emission driver that is split into several portions in accordance with an embodiment.

FIG. 9 is a top view of an illustrative display that is operable in a normal scanning mode and a partial scanning mode. In the normal scanning mode, every row in the display may be scanned during each frame. In the partial scanning mode, only some rows in the display may be scanned during each frame. The refresh rate of the display may be higher in the partial scanning mode than in the normal scanning mode. To allow the display to operate in two modes, pixel array 28 may be divided into different sections. In the illustrative example shown in FIG. 9, display 14 has been divided into section A, section B, section C, section D, and section E. During the normal scanning mode, the rows of section A, section B, section C, section D, and section E may all be scanned during each frame. However, during the partial scanning mode, only the rows of section B and section D may be scanned during each frame. This means that only section B and section D of the display will be used to display images during partial scanning mode operation. During normal scanning mode operation, section A, section B, section C, section D, and section E may all be used to display images.

Each section of the display may have corresponding gate driver and emission driver portions. Section A may have corresponding gate driver portions 52-A and emission driver portions 54-A, section B may have corresponding gate driver portions 52-B and emission driver portions 54-B, section C may have corresponding gate driver portions 52-C and emission driver portions 54-C, section D may have corresponding gate driver portions 52-D and emission driver portions 54-D. and section E may have corresponding gate driver portions 52-E and emission driver portions 54-E. During normal scanning operation, each gate driver portion may be connected to the subsequent gate driver portion (i.e., gate driver portion 52-A is coupled to gate driver portion 52-B, gate driver portion 52-B is coupled to gate driver portion 52-C, etc.). However, during partial scanning operation, gate driver portion 52-B may be coupled to gate driver portion 52-D. Gate driver portion 52-A, gate driver portion 52-C, and gate driver portion 52-E may not be used to scan rows during partial scanning operation.

The example in FIG. 9 of the display being split into five separate sections is merely illustrative. The display may be split into any desired number of sections, with any desired sections being disabled in the partial scanning mode.

Figure 10A:
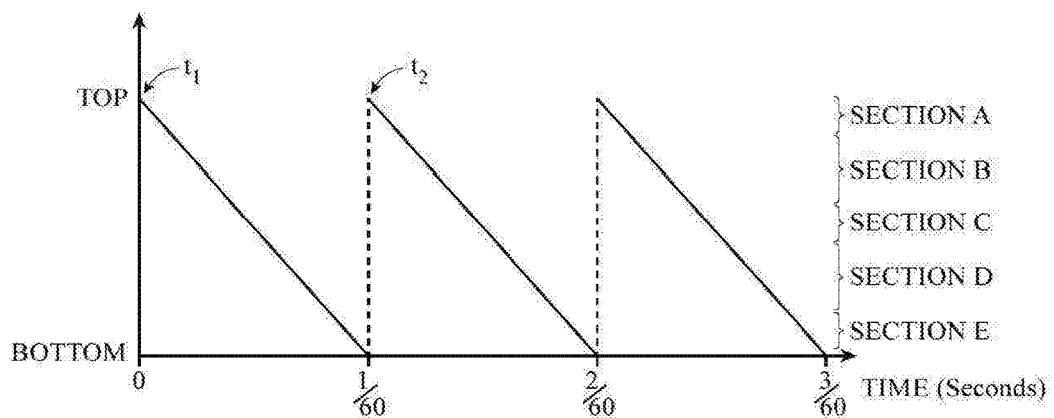
FIG. 10A is a diagram showing the scanning scheme of an illustrative display while the display operates in a normal scanning mode in accordance with an embodiment.
Figure 10B:
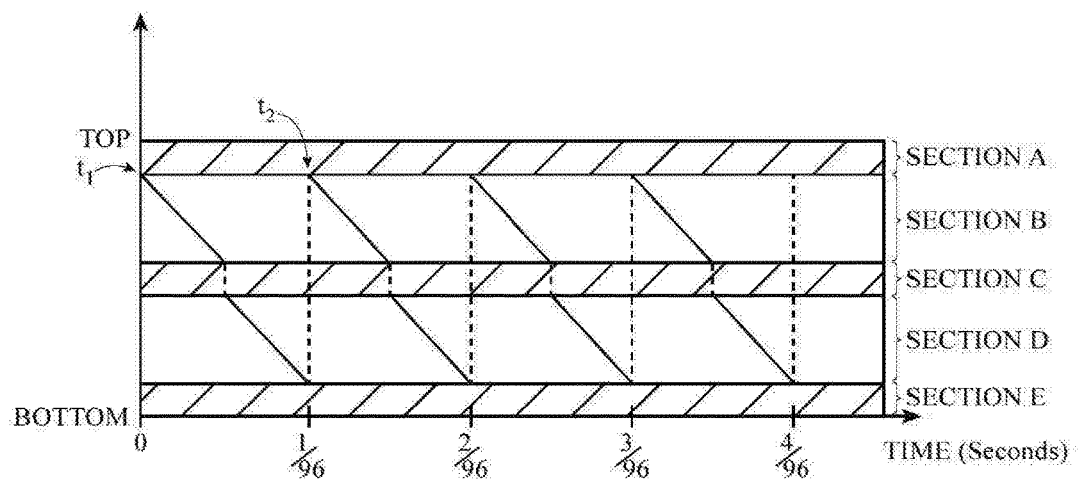
FIG. 10B is a diagram showing the scanning scheme of an illustrative display while the display operates in a partial scanning mode in accordance with an embodiment.

FIGS. 10A and 10B are timing diagrams of an illustrative display operating in a normal scanning mode and a partial scanning mode. FIG. 10A shows the display operating in a normal scanning mode. At $t_1$, the first row of the display (i.e., the row at the top of the active area of the display) may be scanned. Each subsequent row of the display may then be scanned. At the bottom of the display, the last row of the display may be scanned as the frame duration of $\frac{1}{60}^{th}$ of a second elapses. After the last row of the display is scanned at $t_2$, the first row may be scanned again as the second frame begins. All of the rows may be scanned from $\frac{1}{60}^{th}$ of a second until $\frac{2}{60}^{th}$ of a second. This pattern may continue with every row in the display being scanned every $\frac{1}{60}^{th}$ of a second.

In certain situations (i.e., when the display is operating in a virtual reality mode), it may be desirable for the display to have a higher refresh rate. TO reduce artifacts and still operate at a high refresh rate, the display may optionally operate in a partial scanning mode. FIG. 10B shows the display operating in a partial scanning mode. At $t_1$, the first row of section B of the display may be scanned. Each subsequent row of section B of the display may then be scanned. After the last row in section B is scanned, the first row of section D may be scanned. At the bottom of section D, the last row of section D may be scanned as the frame duration of $\frac{1}{96}^{th}$ of a second elapses. After the last row in section D is scanned at $t_2$, the first row of section B may be scanned again as the second frame begins. The rows in section B and section D may be scanned again from $\frac{1}{96}^{th}$ of a second until $\frac{2}{96}^{th}$ of a second. This pattern may continue with every frame in section B and section D of the display being scanned every $\frac{1}{96}^{th}$ of a second. The rows of section A, section C, and section E may not be scanned or emit light when the display operates in the partial scanning mode.

The examples of frame durations shown in FIGS. 10A and 10B (i.e., 60 Hz for the normal scanning mode of FIG. 10A and 96 Hz for the partial scanning mode of FIG. 10B) are merely illustrative. In general, the display may operate at any desired refresh rate during the normal scanning mode and at any desired refresh rate during the partial scanning mode. However, during the normal scanning mode all of the rows of the display may be scanned whereas during the partial scanning mode only some of the rows of the display may be scanned.

Figure 11:
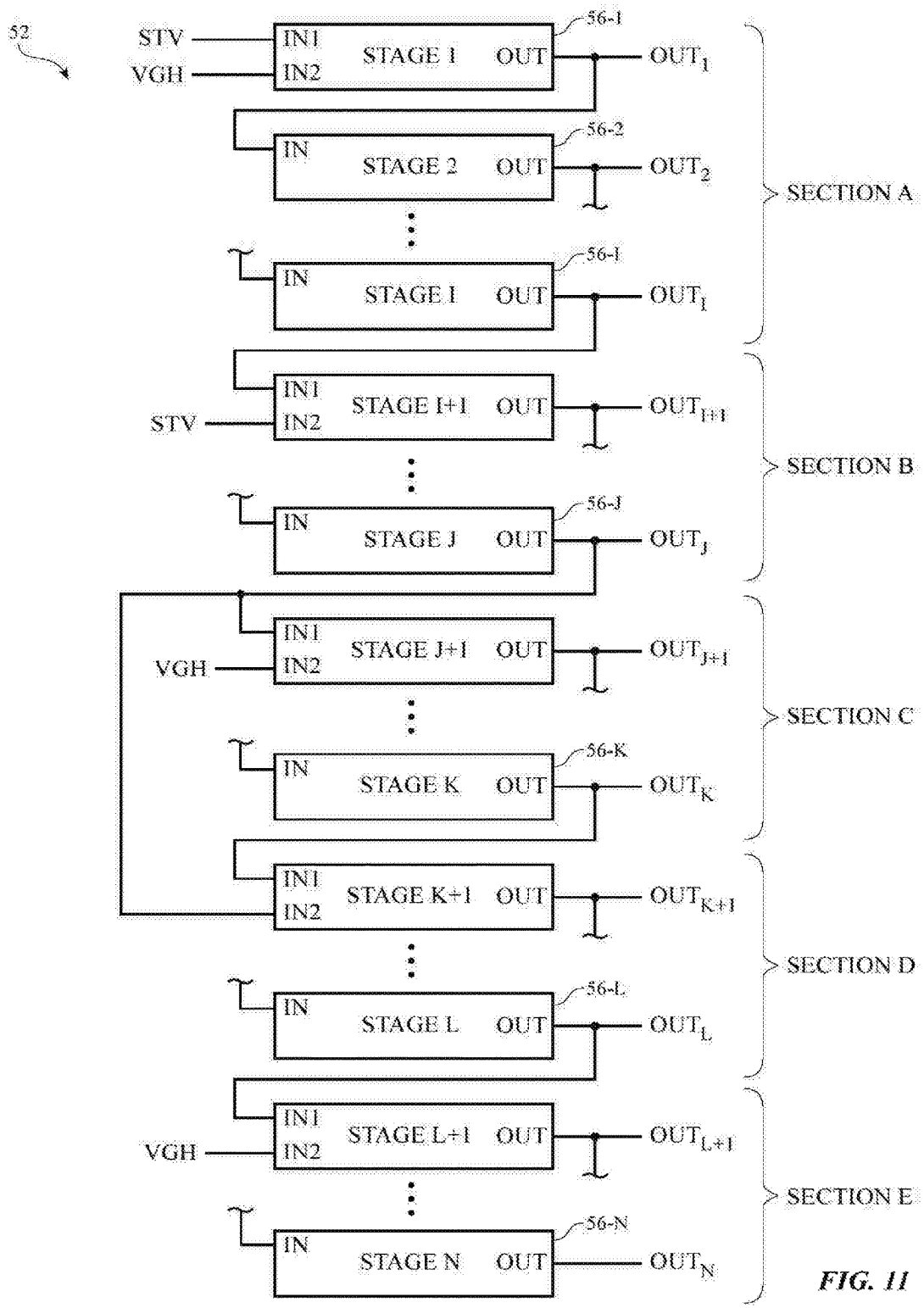
FIG. 11 is a schematic diagram of an illustrative shift register that may be used to form a gate driver or an emission driver for a display that can operate in a normal scanning mode and a partial scanning mode in accordance with an embodiment.

FIG. 11 is a schematic diagram of a shift register that may be used to form a gate driver for a display with a normal scanning mode and a partial scanning mode. The shift register may include a chain of register circuits 56. Each register circuit may supply a horizontal control signal to a corresponding row of pixels. For example, a first register circuit 56-1 may have an output $OUT_1$ that is coupled to the first row of pixels in the display. The second register circuit 56-2 may have an output $OUT_2$ that is coupled to the second row of pixels in the display. The $I^{th}$ register circuit 56-1 may have an output $OUT_1$ that is coupled to the $I^{th}$ row of pixels in the display. This pattern may continue until the last row of the display. Register circuit 56-N may be associated with the last row of pixels in the active area and may have an output $OUT_N$ that is coupled to the last row of pixels in the display.

As discussed in connection with FIG. 9, gate driver 52 may have different portions (section A, section B, section C, section D, and section E). Section A of gate driver 52 may include stages 1, 2, . . . , and J of the shift register. Section B of gate driver 52 may include stages I+1, . . . , and J of the shift register. Section C of gate driver 52 may include stages J+1, . . . , and K of the shift register. Section D of gate driver 52 may include stages K+1, . . . , and L of the shift register. Section E of gate driver 52 may include stages L+1, . . . , and N of the shift register. Each stage of the shift register may be coupled to the subsequent stage. For example, the last stage of section A (stage I) may be coupled to the first stage of section B (stage I+1), the last stage of section B (stage J) may be coupled to the first stage of section C (stage J+1), the last stage of section C (stage K) may be coupled to the first stage of section D (stage K+1), and the last stage of section D (stage L) may be coupled to the first stage of section E (stage L+1).

In order to allow the display to operate in two modes, some of the register circuits may have two inputs. In particular, the first stage of each section may have two inputs. The first stage (56-1) of section A may have a first input (IN1) that receives a control pulse (STV). The first stage of section A may have a second input (IN2) that receives supply voltage VGH. The first stage (stage I+1) of section B may have a first input (IN1) that receives the output from the last stage of section A (stage I). The first stage of section B may have a second input (IN2) that receives a control pulse (STV). The first stage (stage J+1) of section C may have a first input (IN1) that receives the output from the last stage of section B (stage J). The first stage of section C may have a second input (IN2) that receives supply voltage VGH. The first stage (stage K+1) of section D may have a first input (IN1) that receives the output from the last stage of section C (stage K). The first stage of section D may have a second input (IN2) that receives the output from the last stage of section B (stage J). The first stage (stage L+1) of section E may have a first input (IN1) that receives the output from the last stage of section D (stage L). The first stage of section E may have a second input (IN2) that receives supply voltage VGH.

When the display is operating in the normal mode, the first stage of each section (i.e., stage I, stage I+1, stage J+1, stage K+1, and stage L+1) may respond to the first input (IN1). Accordingly, in the normal mode stage I may receive control pulse STV and propagate the control pulse throughout the shift register in the normal mode. The control pulse will be passed from the last stage of section A (stage I) to the first stage of section B (stage I+1), from the last stage of section B (stage J) to the first stage of section C (stage J+1), from the last stage of section C (stage K) to the first stage of section D (stage K+1), and from the last stage of section D (stage L) to the first stage of section E (stage L+1).

When the display is operating in the partial mode, the first stage of each section (i.e., stage I, stage I+1, stage J+1, stage K+1, and stage L+1) may respond to the second input (IN2). This means that stage I, stage J+1, and stage L+1 will all receive supply voltage VGH, ensuring that sections A, C, and E of the gate driver will not be used. Stage I+1 may receive control pulse STV and propagate the control pulse throughout the register circuits of section B and section D. The control pulse will be passed from the last stage of section B (stage J) to the first stage of section D (stage K+1). This way, only the rows in section B and section D of the display will be addressed.

Figure 12:
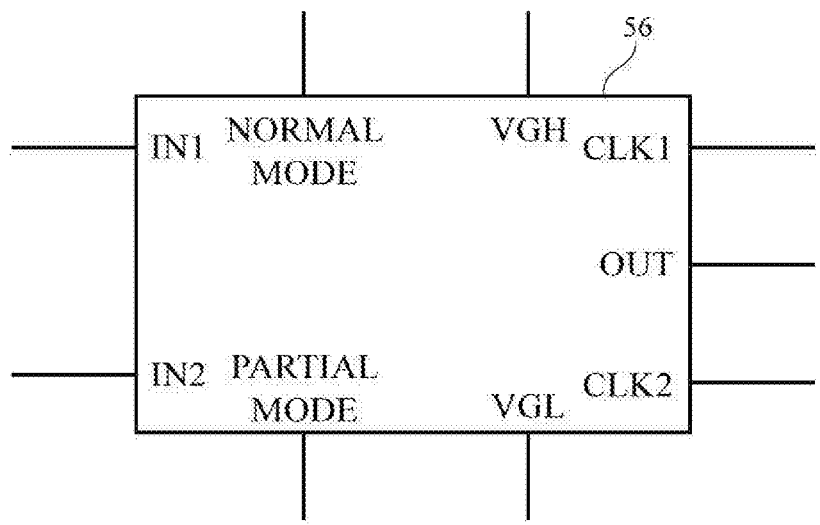
FIG. 12 is a schematic diagram of an illustrative register circuit that may be used in the shift register of FIG. 11 in accordance with an embodiment.

For simplicity, each register circuit in FIG. 11 is depicted as having either one or two inputs and a single output. However, each register circuit may have additional inputs and/or outputs as shown in FIG. 12. FIG. 12 shows a detailed view of a register circuit that may be used to form a shift register for gate driver 52 or emission driver 54. The register circuit may include a first input (IN1), a second input (IN2), and an output (OUT). The register circuit may also receive clock signals CLK1 and CLK2. Each register circuit may receive first and second supply voltages VGH and VGL. In addition, the register circuit may receive additional control signals used to determine whether or not the display is operating in the normal mode or the partial mode. The register circuit may receive a normal mode signal and a partial mode signal. If the normal mode signal is asserted at a logic high level, the register circuit may use input 1 and operate in the normal mode. If the partial mode signal is asserted at a logic high level, the register circuit may use input 2 and operate in the partial mode. The first stage of each section in the display (i.e., stage I, stage I+1, stage J+1, stage K+1, and stage L+1, may be register circuits of the type shown in FIG. 12. The last stage of each section in the display (i.e., stage I, stage J, stage K, stage L, and stage N) and the stages in between the first and last stages in each section may be register circuits of the type shown in FIG. 6 (i.e., with only one input instead of two).

The shift register structure shown in FIGS. 11 and 12 was described as forming a gate driver (e.g., gate driver 52 in FIG. 9). However, this type of structure may also be used to form an emission driver (e.g., emission driver 54 in FIG. 9). Instead of control pulse STV, one or more stages of a shift register for emission driver 54 may receive an emission control pulse EMSTV. The output of the register circuits of gate driver 52 shown in FIG. 9 may be provided as control signals GW or GI to pixels 22, while the output of the register circuits of an emission driver 54 may be provided as emission enable control signal EM to pixels 22.

In some embodiments, additional transistors may be included in the shift register of the display (i.e., the shift register of FIG. 1) to select one of the two input signals. For example, stage I of the shift register may include an input node to which IN1 and IN2 are coupled. A first transistor may be asserted to couple IN1 to the input node, or a second transistor may be asserted to couple IN2 to the input node. The second transistor may be deasserted while the first transistor is asserted, and the first transistor may be deasserted while the second transistor is asserted. The first and second transistors may be controlled by the normal mode signal and the partial mode signal shown in FIG. 12, for example. The shift register for both gate driver 52 and emission driver 54 may both receive the normal mode signal and the partial mode signal. The normal mode signal and the partial mode signal may be globally controlled. Any other desired components may be used (i.e., a switch) by the shift register to select one of two or more inputs to be used by a register circuit.

If desired, additional enable signals may be included to provide further control in the partial scanning mode. In some embodiments, the gate driver may have an additional stage compared to the emission driver. The gate driver may have an initialization stage that is not associated with a row of display pixels. During normal scanning mode operation, the initialization stage of the gate driver may receive a control pulse and the first stage of the emission driver (that is associated with the first row of display pixels) may receive an emission enable control pulse. During the partial scanning mode, the emission enable control pulse may be provided to the first stage of the section of the display that is enabled (i.e., stage I+1 as shown in FIG. 11). However, the control pulse for the gate driver may be provided to the last stage of the first section that is disabled (i.e., the control pulse would be provided to stage I in FIG. 11 instead of stage I+1). This allows the last stage of disabled section to act as the initialization stage for the enabled section of the display.

Several of the aforementioned embodiments have described gate driver circuitry for a light-emitting diode display. It should be noted that similar concepts may be used in a liquid crystal display. For example, a liquid crystal display may have gate driver circuitry that includes a shift register. The shift register may be operable in a normal scanning mode in which all of the rows in the display are scanned or a partial scanning mode in which only some of the rows in the display are scanned. In general, any desired type of display may be configured to operate in a partial scanning mode and a normal scanning mode.

In various embodiments, a display may include an array of pixels formed in an active area of the display that includes rows and columns of pixels, display driver circuitry formed in an inactive area of the display that is configured to provide image data to the pixels, and gate driver circuitry formed in the inactive area of the display. The gate driver circuitry may include a shift register that includes a plurality of register circuits, each register circuit may have at least one output that is provided to a corresponding row of pixels, at least one register circuit in the shift register may have a first input and a second input that is different than the first input, the first input may be used when the display operates in a first mode, and the second input may be used when the display operates in a second mode.

The first input may be a control pulse and the second input may be a supply voltage. The at least one register circuit may include a first register circuit. The first input of the first register circuit may be an output of a second register circuit that is directly adjacent to the first register circuit and the second input of the first register circuit may be a control pulse. The first input of the first register circuit may be an output of a second register circuit that is directly adjacent to the first register circuit and the second input of the first register circuit may be an output of a third register circuit that is not directly adjacent to the first register circuit. The first input of the first register circuit may be an output of a second register circuit that is directly adjacent to the first register circuit and the second input of the first register circuit may be a supply voltage.

The display may have a total number of rows of pixel, the shift register may scan every row in the array of pixels when the display operates in the first mode, and the shift register may scan only a given number of rows that is less than the total number of rows when the display operates in the second mode. The first mode may be a normal scanning mode in which every row of pixels in the display is scanned. The second mode may be a partial scanning mode in which only a subset of rows of pixels in the display are scanned. The display may have a first refresh rate in the normal scanning mode and a second refresh rate in the partial scanning mode and the second refresh rate may be higher than the first refresh rate.

In various embodiments, a display may include a plurality of display pixels arranged in rows and columns, display driver circuitry configured to provide image data for a frame to the display pixels, and gate driver circuitry. The gate driver circuitry may include a shift register configured to scan rows of display pixels by asserting gate line signals in sequence, the shift register may be configured to operate in a normal scanning mode in which every row of display pixels is scanned in each frame, and the shift register may be configured to operate in a partial scanning mode in which only a subset of the rows of display pixels are scanned in each frame.

The shift register may include a plurality of register circuits and at least one register circuit may receive a partial mode control signal and a normal mode control signal. The shift register may be configured to operate in the normal scanning mode when the normal mode control signal is asserted and the shift register may be configured to operate in the partial scanning mode when the partial mode control signal is asserted. The at least one register circuit may be coupled to a first input and a second input, the at least one register circuit may use the first input when the normal mode control signal is asserted, and the at least one register circuit may use the second input when the partial mode control signal is asserted. The at least one register circuit may include a first register circuit, the first input of the first register circuit may be an output of a second register circuit that is directly adjacent to the first register circuit, and the second input of the first register circuit may be an output of a third register circuit that is not directly adjacent to the first register circuit.

In various embodiments, a display configured to operate in a first mode and a second mode may include an active area with display pixels that has a first portion and a second portion and gate driver circuitry. The gate driver circuitry may be configured to address the first and second portions of the active area when the display operates in the first mode and the gate driver circuitry may be configured to address only the first portion of the active area when the display operates in the second mode.

The gate driver circuitry may include a shift register with a plurality of register circuits. The active area may include a first section at the top of the active area, a second section at the bottom of the active area, and a third section interposed between the first section and the second section. The first, second, and third sections of the active area may form the second portion of the active area. The active area may also include a fourth section that is interposed between the first section and the third section and a fifth section that is interposed between the second section and the third section. The fourth and fifth sections may form the first portion of the active area. The shift register may have a first plurality of register circuits that correspond to the first section of the display, a second plurality of register circuits that correspond to the second section of the display, a third plurality of register circuits that correspond to the third section of the display, a fourth plurality of register circuits that correspond to the fourth section of the display, and a fifth plurality of register circuits that correspond to the fifth section of the display. The first register circuit in the first plurality of register circuits may have a first input and a second input, the first register circuit in the second plurality of register circuits may have a third input and a fourth input, the first register circuit in the third plurality of register circuits may have a fifth input and a sixth input, the first register circuit in the fourth plurality of register circuits may have a seventh input and an eighth input, and the first register circuit in the fifth plurality of register circuits may have a ninth input and a tenth input.

The first input may be a control pulse, the second input may be a supply voltage, the third input may be an output of a register circuit that is directly adjacent to the first register circuit of the second plurality of register circuits, the fourth input may be a supply voltage, the fifth input may be an output of a register circuit that is directly adjacent to the first register circuit of the third plurality of register circuits, the sixth input may be a supply voltage, the seventh input may be an output of a register circuit that is directly adjacent to the first register circuit of the fourth plurality of register circuits, the eighth input may be a control pulse, the ninth input may be an output of a register circuit that is directly adjacent to the first register circuit of the fifth plurality of register circuits, and the tenth input may be an output of a register circuit that is not directly adjacent to the first register circuit of the fifth plurality of register circuits.

The foregoing is merely illustrative and various modifications can be made by those skilled in the art without departing from the scope and spirit of the described embodiments. The foregoing embodiments may be implemented individually or in any combination.

What is claimed is:

1. A display comprising:
   an array of pixels formed in an active area of the display, wherein the array of pixels comprises rows and columns of pixels;
   display driver circuitry formed in an inactive area of the display, wherein the display driver circuitry is configured to provide image data to the pixels; and
   gate driver circuitry formed in the inactive area of the display, wherein the gate driver circuitry comprises a shift register that includes a plurality of register circuits, wherein each register circuit has at least one output that is provided to a corresponding row of pixels, wherein at least one register circuit in the shift register has a first input and a second input that is different than the first input, wherein the first input is used when the display operates in a first mode, wherein the second input is used when the display operates in a second mode, wherein the at least one register circuit comprises a first register circuit, wherein the first input of the first register circuit is an output of a second register circuit that is directly adjacent to the first register circuit, and wherein the second input of the first register circuit is an output of a third register circuit that is not directly adjacent to the first register circuit.

2. The display defined in claim 1, wherein the display has a total number of rows of pixel, wherein the shift register scans every row in the array of pixels when the display operates in the first mode, and wherein the shift register scans only a given number of rows that is less than the total number of rows when the display operates in the second mode.

3. The display defined in claim 1, wherein the first mode is a normal scanning mode in which every row of pixels in the display is scanned.

4. The display defined in claim 3, wherein the second mode is a partial scanning mode in which only a subset of rows of pixels in the display are scanned.

5. The display defined in claim 4, wherein the display has a first refresh rate in the normal scanning mode and a second refresh rate in the partial scanning mode and wherein the second refresh rate is higher than the first refresh rate.

6. A display comprising:
   a plurality of display pixels arranged in rows and columns;

display driver circuitry configured to provide image data for a frame to the display pixels; and gate driver circuitry, wherein the gate driver circuitry comprises a shift register configured to scan rows of display pixels by asserting gate line signals in sequence, wherein the shift register is configured to operate in a normal scanning mode in which every row of display pixels is scanned in each frame, wherein the shift register is configured to operate in a partial scanning mode in which only a subset of the rows of display pixels are scanned in each frame, wherein the shift register comprises a plurality of register circuits, wherein the plurality of register circuits includes a first register circuit that is coupled to a first input and a second input, wherein the first register circuit uses the first input in the normal scanning mode and the second input in the partial scanning mode, wherein the first input is a control pulse that is received from control circuitry and not from an intervening register circuit and wherein the second input is a supply voltage.

7. The display defined in claim 6, wherein the first register circuit receives a partial mode control signal and a normal mode control signal.

8. The display defined in claim 7, wherein the shift register is configured to operate in the normal scanning mode when the normal mode control signal is asserted and wherein the shift register is configured to operate in the partial scanning mode when the partial mode control signal is asserted.

9. The display defined in claim 8, wherein the at least one register circuit uses the first input when the normal mode control signal is asserted and wherein the at least one register circuit uses the second input when the partial mode control signal is asserted.

10. The display defined in claim 6, wherein the first register circuit is coupled to a third input and a fourth input, wherein the third input is a first clock signal and the fourth input is a second clock signal.

11. The display defined in claim 6, wherein the first register circuit is coupled to a gate line for a given row of display pixels, and wherein the given row of display pixels is not scanned in the partial scanning mode.

12. The display defined in claim 11, wherein the given row of display pixels is the first row of display pixels in the display.

13. A display configured to operate in a first mode and a second mode, the display comprising:

an active area with display pixels, wherein the active area has a first portion and a second portion; and gate driver circuitry, wherein the gate driver circuitry is configured to address the first and second portions of the active area when the display operates in the first mode wherein the gate driver circuitry is configured to address only the first portion of the active area when the display operates in the second mode, wherein the gate driver circuitry comprises a shift register with a plurality of register circuits, wherein the active area comprises a first section at the top of the active area, a second section at the bottom of the active area, and a third section interposed between the first section and the second section, wherein the first, second, and third sections of the active area form the second portion of the active area, wherein the active area further comprises a fourth section that is interposed between the first section and the third section and a fifth section that is interposed between the second section and the third section, wherein the fourth and fifth sections form the first portion of the active area, wherein the shift register has a first plurality of register circuits that correspond to the first section of the display, a second plurality of register circuits that correspond to the second section of the display, a third plurality of register circuits that correspond to the third section of the display, a fourth plurality of register circuits that correspond to the fourth section of the display, and a fifth plurality of register circuits that correspond to the fifth section of the display, wherein the first register circuit in the first plurality of register circuits has a first input and a second input, wherein the first register circuit in the second plurality of register circuits has a third input and a fourth input, wherein the first register circuit in the third plurality of register circuits has a fifth input and a sixth input, wherein the first register circuit in the fourth plurality of register circuits has a seventh input and an eighth input, wherein the first register circuit in the fifth plurality of register circuits has a ninth input and a tenth input, wherein the first input is a control pulse, wherein the second input is a supply voltage, wherein the third input is an output of a register circuit that is directly adjacent to the first register circuit of the second plurality of register circuits, wherein the fourth input is a supply voltage, wherein the fifth input is an output of a register circuit that is directly adjacent to the first register circuit of the third plurality of register circuits, wherein the sixth input is a supply voltage, wherein the seventh input is an output of a register circuit that is directly adjacent to the first register circuit of the fourth plurality of register circuits, wherein the eighth input is a control pulse, wherein the ninth input is an output of a register circuit that is directly adjacent to the first register circuit of the fifth plurality of register circuits, and wherein the tenth input is an output of a register circuit that is not directly adjacent to the first register circuit of the fifth plurality of register circuits.

* * * * *